United States Patent [19]

Realini

[11] 4,159,747

[45] Jul. 3, 1979

[54] TEMPERATURE-COMPENSATED WEIGHING APPARATUS

[75] Inventor: Enrico Realini, Uster, Switzerland

[73] Assignee: Mettler Instrument AG, Greifensee, Switzerland

[21] Appl. No.: 901,986

[22] Filed: May 1, 1978

[30] Foreign Application Priority Data

Jun. 29, 1977 [CH] Switzerland .......................... 8013/77

[51] Int. Cl.² .............................................. G01G 7/02
[52] U.S. Cl. .............................. 177/210 EM; 177/212
[58] Field of Search ............. 177/212, 210 EM, 210 C

[56] References Cited

U.S. PATENT DOCUMENTS

| 4,034,819 | 7/1977 | Akers | 177/212 X |
| 4,099,587 | 7/1978 | Kaufmann | 177/212 X |

Primary Examiner—Joseph W. Hartary
Attorney, Agent, or Firm—Lawrence E. Laubscher

[57] ABSTRACT

A weighing system is disclosed of the electromagnetic compensation return-to-neutral type including first and second series-connected compensation coils connected with the weighing pan support, a supply of compensating current connected with the compensation coils, a periodically operable position-responsive switch connected in parallel across the first compensation coil for dividing the compensating current into a continuous first current portion which generally corresponds with the preloading effect of the load support, and a second portion that is periodically supplied to the first coil for periods of time that are a function of the magnitude of the load applied to the load support, and an indicating device responsive only to the second compensating current portion for indicating the magnitude of the load as a function of the compensating current required to return the load support to its neutral position, characterized by the provision of an impedance component electrically connected in parallel with, and physically arranged in spaced non-heat-conducting relation to, the second compensation coil, thereby to stabilize the preloading effect for variations in temperature of the weighing system components during use. Preferably the impedance component and the second compensation coil are formed of materials having generally the same coefficient of thermal resistivity. The impedance component may be a multi-tap coil or a resistor.

6 Claims, 2 Drawing Figures

TEMPERATURE-COMPENSATED WEIGHING APPARATUS

REFERENCE TO RELATED APPLICATION

This application is a companion application to U.S. application Ser. No. 732,480 filed Oct. 14, 1976, now U.S. Pat. No. 4,099,587, in the same of Peter Kaufmann.

BRIEF DESCRIPTION OF THE PRIOR ART

It is well known in the patented prior art to provide weighing apparatus of the electromagnetic compensation type, as evidenced, for example, by the patents to Baumgartner U.S. Pat. No. 3,677,357, Strobel U.S. Pat. No. 3,688,854, Kunz U.S. Pat. Nos. 3,786,678 and 3,786,883, Allenspach U.S. Pat. No. 3,786,884, Allenspach et al U.S. Pat. No. 3,788,410, Strobel et al U.S. Pat. No. 3,789,937 and Baumann et al U.S. Pat. No. 3,816,156.

In some of these known systems, a compensation coil arranged in the air gap of a stationary permanent magnet system is electrically associated with a switch member which is operable periodically to conduct current from a compensation current generator through the compensation coil for a period of time which is proportional to the load to be weighed. The switch member is controlled by a control and comparison circuit, and counter means are provided for counting constant-frequency pulses during the period of time that the compensation current generator is connected with the compensation coil. The counter result is then displayed at a digital display device as the weighing result.

In such a weighing apparatus, deflection of the support means for carrying an article or material to be weighed, under the effect of the weight thereof, away from a normal neutral position is compensated or counteracted by the interaction between the electric current in the coil, and the magnetic field of the permanent magnet system. In the equilibrium condition, that is to say, after the carrier means has substantially returned to its neutral position, the magnitude of the current flowing in the coil is proportional to the load to be weighed. As mentioned above, the flowing current is determined on the principle of time comparision, and is displayed digitally. One possible way of doing this is to take the current from a pulse generator, counting the current pulses which are applied to the coil in each selected time unit, and displaying the count result. Another possibility is using a constant current and counting off, by means of time marks such as clock pulses, those time intervals during which the constant current flows in the coil, and displaying the sum of the clock pulses.

In the aforementioned Kaufmann application Ser. No. 732,480, the compensation coil means includes a preloading compensation coil connected between the compensation coil and the compensating current source, so that the effective compensation current active in the air gap is made up of a first portion which essentially compensates only for a preliminary load on the weighing mechanism and which will not be influenced by the switching member, as well as a second portion which essentially compensates only for the weighing load and which is controlled by the switching member, whereby only the last-mentioned portion is used to determine the weighing results.

This preferred version of the Kaufmann application is one of the possibilities for solving the problem of compensating for dead load or for a preliminary load on the scale, respectively, independently of the weighing load, in such a manner that the full resolution will at least approximately be exclusively available for the weighing load (including a possible tare).

It is known that the heat output (power loss) of a conductor, through which current flows, is proportional to the square of the current. The current, on the other hand, is proportional to the load in accordance with the working principle of the scales considered here. In other words, the temperature in the system changes as a function of the load to be compensated for and that leads to noticeable falsifications of the measurement results, especially in scales with higher resolution. In scales having parallel guided pan supports, for example, the errors essentially result from the temperature influence on the movable ends of the guides, and on their positioning, respectively.

Thus, for example, the zero point of the scale can be shifted downward by several units of the last-indicated decimals.

It is the purpose of the present invention essentially to reduce the described temperature influence in a scale of the kind described above. According to the invention at hand, this is accomplished in that a resistor is connected parallel to the second compensation coil, spatially separated in non-heat conducting relation relative to the latter.

SUMMARY OF THE INVENTION

Accordingly, a primary object of the present invention is to provide an improved weighing apparatus of the electromagnetic compensation return-to-neutral type including first and second series-connected compensation coils connected with the weighing pan support, a supply of compensating current connected with the compensation coils, periodically operable position-responsive switch means connected in parallel across the first compensation coil for dividing the compensating current into a continuous first current portion which generally corresponds with the preloading effect of the load support, and a second portion that is periodically supplied to the first coil for periods of time that are a function of the magnitude of the load applied to the load support, and indicating means responsive only to the second compensating current portion for indicating the magnitude of the load as a function of the compensating current required to return the load support to its neutral position, characterized by the provision of impedance means electrically connected in parallel with, and physically arranged in spaced non-heat-conducting relation to, the second compensation coil, thereby to stabilize the preloading effect for variations in temperature of the weighing system components during use.

According to a more specific object of the invention, the parallel connected impedance means and the second compensation coil are formed of materials having generally the same coefficient of thermal resistivity. The impedance component may be a multi-tap coil or a resistor.

BRIEF DESCRIPTION OF THE DRAWING

Other objects and advantages of the present invention will become apparent from a study of the following specification when viewed in the light of the accompanying drawing, in which.

DETAILED DESCRIPTION

Figure 1:
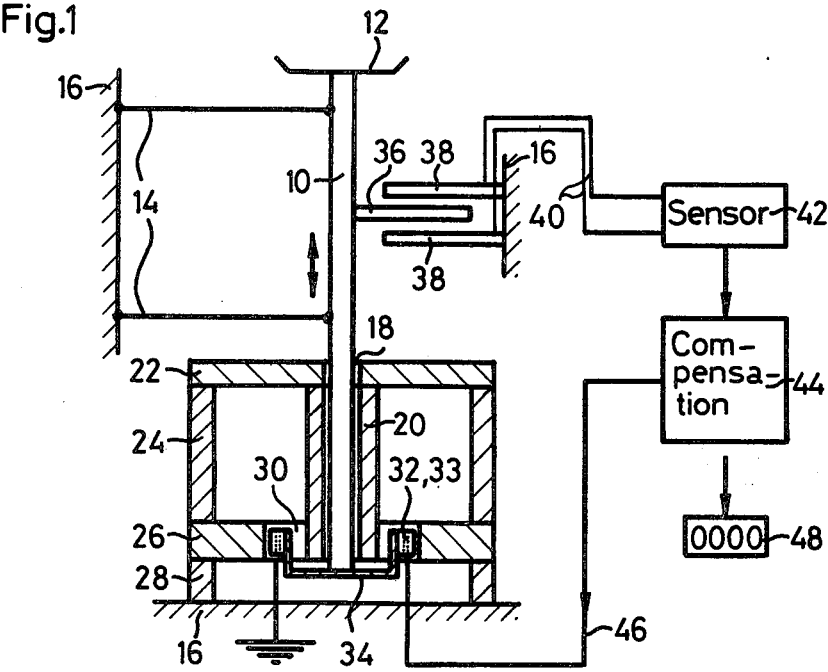
FIG. 1 is a diagrammatic illustration of an electromagnetically-compensated weighing apparatus in which the temperature compensating means of the present invention is incorporated.

Referring first more particularly to FIG. 1, the apparatus includes load-carrier means including a vertical suport rod or tube 10 and a weighing pan 12, said load-carrier means being guided for vertical parallel movement by means of two links 14 connected with the apparatus frame 16. The vertical support 10 passes with clearance through a central passage 18 contained in a cylindrical iron core 20 which is secured to an upper circular closure plate 22 of ferromagnetic material. Arranged concentrically around the core 20 is a permanent pot magnet 24 which at its top end is connected to the plate 22 and at its bottom end to a pole shoe plate 26. An annular base 28 of non-magnetic material forms a mounting for the magnet system 22, 24, 26 on the frame 16. Compensation coil means 32, 33 secured to the vertical support 10 are moveable in an annular air gap 30 between the core 20 and the pole shoe 26, said compensation coil means including a pair of coils wound on a carrier 34 of electrically insulating material carried by the vertical support 10.

A capacitor plate 36 is secured to the vertical support 10 at a position intermediate the levels of the two links 14, but on the side of the support 10 remote from the links 14. The movable capacitor plate 36 is disposed in the gap between two stationary capacitor plates 38 which are mounted on the frame 16, the capacitor plates 36, 38 forming a differential capacitor.

Other conventional mechanical details of the apparatus such as housing, travel limiting means (abutments) and the like, have been omitted for the sake of clarity.

The electrical circuitry of the weighing apparatus of FIG. 1, which is only shown by way of diagrammatic indication herein, includes, besides the coil 32 and the differential capacitor 36 and 38, a sensing or transmitter circuit 42 which is generally in the form of a bridge circuit and which is connected by leads 40 to the capacitor plates 38. The sensing circuit output terminal is connected with a compensation circuit 44 which includes, inter alia, a control amplifier, a current source and an evaluation circuit, said compensation circuit having a first output terminal connected with the compensation coil means, and a second output terminal connected with conventional digital display means 48. As is known in the art, upon the application of a load to be weighted to the pan carrier, the pan carrier and the vertical support 10 are displaced downwardly from the illustrated no-load or neutral positions (i.e., the position at which the capacitor plate 36 is positioned at equally spaced relation between the two plates 38), thereby producing a difference or error signal in the transmitter circuit 42. In the control portion of the circuit 44, this difference or error signal determines the magnitude for a compensation current flowing through the compensation coil means. In the steady condition of the apparatus, the electromagnetic force produced by the compensation coil means in the air gap 30 of the permanent magnet field compensates or counteracts the effect of the weight of the material being weighed on the weighing pan 12 (and the dead load of the apparatus, that is to say, the weight of the movable part of the apparatus, including the members 10, 12). Thus the counteracting force causes the apparatus to be returned substantially to its no-load or neutral position. The magnitude of the compensation current required for this purpose is converted into a digital weight value in the evaluation part of the circuit, and displayed at the display means 48.

Figure 2:
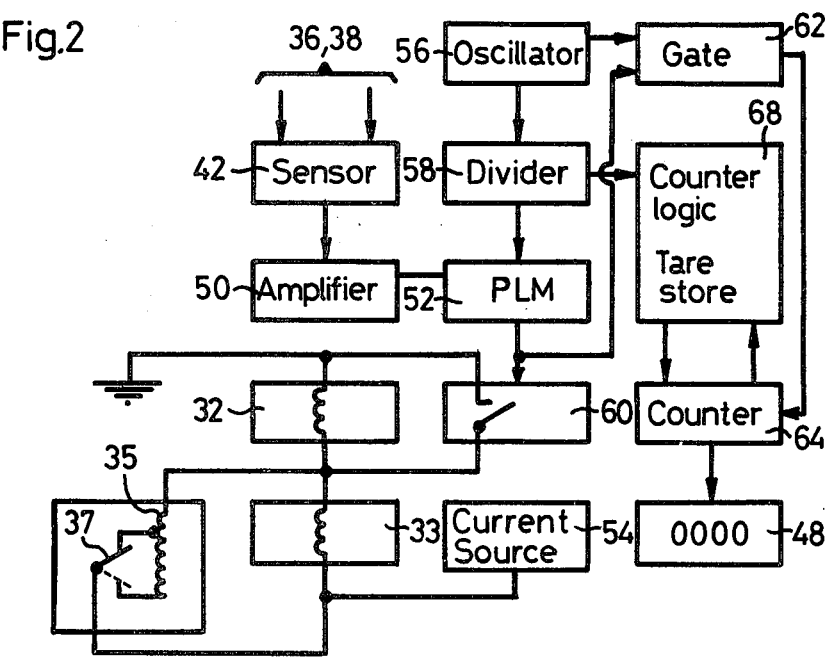
FIG. 2 is an electrical block diagram of the weighing apparatus of FIG. 1.

Referring now to the block diagram of FIG. 2, the illustrated weighing apparatus operates on the known principle of pulse length modulation. Thus, the output control signal from sensing circuit 42 is passed to a control amplifier 50 and from there to a pulse length modulator 52. Here the control signal is compared to a constant-frequency sawtooth voltage of period T. An oscillator 56 acting as a clock transmitter starts the sawtooth voltage in the pulse length modulator 52, at a frequency which is reduced in the frequency divider 58; at the same time the pulse length modulator 52 transmits a signal to an electronic switch 60 which opens at that moment and thus causes current from a constant source 54 to be conducted through the coil 32. As soon as the sawtooth voltage in the pulse length modulator 52 has reached the value of the control signal, the switch 60 is closed by a further signal from the pulse length modulator 52 to the switch 60 and thus the current is conducted only through the switch. The switch 60 is preferably virtually without resistance, so that virtually no current flows through the coil 32 when the switch is closed. This sequence is repeated in each period T. The operation of this circuit is known in the art, as evidenced, for example, by the patents to Kunz U.S. Pat. No. 3,786,883 and Allenspach U.S. Pat. No. 3,786,884.

During the time that the current source 54 is connected with the coil 32, high-frequency clock pulses pass from the oscillator 56 through a gate 62 into a counter 64. When the current is switched over from the coil 32 to the switch 60 the gate 62 is closed, and the counter condition is transferred into a storage means (not shown) and displayed at 48 as the weight result. At the beginning of the next following period T, the gate 62 is opened again by the pulse length modulator 52 and the counter 64 is set to zero by means of a counter logic unit 68 controlled by the frequency divider 58; the next evaluation cycle can then commence.

In accordance with the teachings of the aforementioned Kaufmann U.S. application Ser. No. 732,480, there is provided an additional compensation coil 33 wound jointly with the coil 32 on the coil carrier 34 (see FIG. 1), one coil above the other. Besides giving a compact construction, this arrangement ensures that the two coils always have the same field lines of flux passing through them. As shown in FIG. 2, the compensation coil 33 is connected in series between the compensation current source 54 and the parallel circuit comprising coil 32 and switch 60. This means that, irrespective of the position of the switch 60, the compensation coil 33 always has a constant current flowing through it. By suitably selecting the number of windings forming the coil 33, adapted to the amplitude of the constant current from source 54 and the strength of the magnetic field, a desired portion of the apparatus preloading or dead load comprising the weight of the carrier rod or tube 10 and the weighing pan 12 may be compensated with that coil 33 so that the monitored current which flows intermittently through the coil 32 is available virtually alone for the weighing range. This construction has the advantage that a current which is identical even in the event of temperature fluctuations flows through both coils 32, 33, even if such current only flows intermittently in one of the coils (i.e., coil 32).

For reasons of stability, it is advantageous for only about 80 to 90% of the above-mentioned preloading to be compensated by means of coil 33, the remainder thus being compensated by means of coil 32. The portion of the pulsed current to the coil 32, corresponding to the remainder of the preloading, can then be separated from the weight value to be determined, by means of an electrical zero setting device, or taring device. This can be effected for example by means of a device which is already known per se and which is therefore not illustrated separately and which involves the counter 64 being in the form of a settable forwards-backwards counter with associated but separated tare storage means.

Thus in a weighing apparatus constructed as in FIG. 2, it is for example, possible for the degree of resolution available for the weighing range to be increased by 40%, with an unchanged counting frequency, with separate compensation, as by coil 33, of only two-thirds of the given dead load of the load-carrier means 10, 12. This value can be substantially increased upon suitable adaptation of the parameters involved, such as dead load, weighing range, and counting frequency.

In accordance with the present invention, an additional coil 35 is connected in parallel with the preloading compensation coil 33. It is physically arranged in spaced non-heat-conducting relation to the preloading compensation coil 33 so that temperature changes in coil 33 will not have an effect on its temperature. Both coils 33 and 35 are wound from the same material (in this case, copper), so that changes in the environmental temperature will not in turn produce a renewed drift of the zero point. The important thing here is not the identity of the material, but rather that they be formed of materials having generally the same coefficient of thermal resistivity. If no fluctuations in the ambient temperature are anticipated, then, instead of coil 35, one could also use, for example, a metal film resistance.

Coil 35 operates as follows. If the force compensation coil 32 is heated on the coil body due to the load-proportional current flow, the second coil 33, which is wound up on the same coil body 34, also becomes warmer and its resistance increases. By connecting the thermally isolated coil 35 in parallel with the preloading coil 33, then a different current division is obtained owing to the increased resistance of coil 33, that is to say, the current flowing through coil 33 becomes smaller. In case of corresponding dimensioning, we can thus considerably reduce or entirely eliminate a negative zero point drift (which would cause the indicated value to be too small). The dimensioning here depends both upon the mechanical structure of the scale and on the magnitude of the dead load to be compensated, as well as the weighing range. A typical case produced a ratio of 20:1 between the resistances of the two coils (35 and 33).

To refine the compensation effect, there is provided a tap 37 which permits selection among several taps on coil 35.

What is claimed is:

1. In a weighing system of the electromagnetic compensation type including load support means for supporting a load for movement from a normal first position relative to a stationary frame; sensing means for generating a signal that is a function of the extent of displacement of said load support means by the load from said first position; permanent magnet means connected with said frame to define an air gap relative to said load supporting means; compensation coil means including first and second compensation coils connected with said load support means and arranged within said air gap; compensating current supply means operable by said sensing means for supplying compensating current to said compensation coil means, said compensating current supply means including a source of compensating current, said second compensation coil being connected in series between said compensating current source and said first compensation coil, means including a switch connected in parallel across said first compensation coil for dividing the compensating current into a continuous first current portion which generally corresponds with the preloading effect of said load support means, and a second portion that is periodically supplied to said first coil means for periods of time that are a function of the magnitude of the load applied to said load support means; control means operable by said sensing means for operating said switch as a function of the position of said load support means relative to said frame; and indicating means for indicating the magnitude of the load as a function of the compensating current required to restore the load supporting means to the first position, said indicating means being responsive only to said second compensating current portion, whereby said indicating means affords an indication of the load being weighed substantially independently of the no-load preloading effect of said load supporting means;

the improvement which comprises temperature compensation means for varying the preloading effect to compensate for changes in temperature of said weighing system, said temperature compensation means including impedance means connected in parallel with said second coil, said impedance means being physically spaced in non-heat conducting relation relative to said second coil.

2. Weighing apparatus as defined in claim 1, wherein said impedance means and said second coil have generally the same coefficient of thermal resistivity.

3. Apparatus as defined in claim 2, wherein said impedance means comprises a multi-tap coil, and further including adjustable tap means for varying the effective length of the portion of the multi-tap coil that is connected in parallel with said second coil.

4. Apparatus as defined in claim 3, wherein the ratio of the resistance of the said portion of the multi-tap coil to the resistance of said second coil is on the order of 20:1.

5. Apparatus as defined in claim 2, wherein said impedance means comprises a metal film resistor.

6. In a weighing system of the electromagnetic compensation type including load support means for supporting a load for movement from a normal first position relative to a stationary frame; sensing means for generating a signal that is a function of the extent of displacement of said load support means by the load from said first position; permanent magnet means connected with said frame to define an air gap relative to said load supporting means; compensation coil means including at least one compensation coil connected with said load support means and arranged within said air gap; compensating current supply means operable by said sensing means for supplying compensating current to said compensation coil means, said compensating current supply means including a source of compensating current, means including a switch connected between said compensating current source and said compensating coil means for dividing the compensating current into a continuous first current portion which corresponds with the preloading effect of said load support means, and a second portion that is periodically supplied to said coil means for periods of time that are a function of the magnitude of the load applied to said load support means, and control means operable by said sensing means for operating said switch as a function of the position of said load support means; and indicating means for indicating the magnitude of the load as a function of the compensating current required to restore the load supporting means to the first position, said indicating means being responsive only to said second compensation current portion, whereby said indicating means affords an indication of the load being weighed substantially independently of the no-load preloading effect of said load supporting means;

the improvement which comprises temperature compensating means for varying only the first compensating current portion to compensate for variations in temperature of the weighing system during operation.

* * * * *